(12) United States Patent
Zhan et al.

(10) Patent No.: US 12,502,156 B2
(45) Date of Patent: Dec. 23, 2025

(54) METHOD FOR DETECTING AND HANDLING DETECTOR PIXELS WITH INTERMITTENT BEHAVIOR FOR A SMALL PIXELATED PHOTON COUNTING COMPUTED TOMOGRAPHY (CT) SYSTEM

(71) Applicant: CANON MEDICAL SYSTEMS CORPORATION, Tochigi (JP)

(72) Inventors: Xiaohui Zhan, Vernon Hills, IL (US); Ruoqiao Zhang, Vernon Hills, IL (US); Cameron Clarke, Vernon Hills, IL (US); Yi Qiang, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 300 days.

(21) Appl. No.: 18/316,700

(22) Filed: May 12, 2023

(65) Prior Publication Data

US 2024/0374232 A1 Nov. 14, 2024

(51) Int. Cl.
*A61B 6/58* (2024.01)
*A61B 6/00* (2024.01)
*A61B 6/03* (2006.01)
*A61B 6/42* (2024.01)
*G01T 1/24* (2006.01)
*G01T 7/00* (2006.01)

(52) U.S. Cl.
CPC ............. *A61B 6/585* (2013.01); *A61B 6/032* (2013.01); *A61B 6/4241* (2013.01); *A61B 6/5205* (2013.01); *G01T 1/247* (2013.01); *G01T 7/005* (2013.01)

(58) Field of Classification Search
CPC ....... A61B 6/585; A61B 6/032; A61B 6/4241; A61B 6/5205; A61B 6/52; G01T 1/247; G01T 1/2992; G01T 1/2964
See application file for complete search history.

(56) References Cited

U.S. PATENT DOCUMENTS

| | | | |
|---|---|---|---|
| 2002/0065611 A1 | 5/2002 | Boehm et al. | |
| 2017/0115409 A1* | 4/2017 | Laurence | ................ G01T 7/005 |
| 2020/0301032 A1* | 9/2020 | Bai | ........................ A61B 6/585 |
| 2022/0342098 A1* | 10/2022 | Zhan | ...................... A61B 6/032 |

FOREIGN PATENT DOCUMENTS

WO  WO-2020010638 A1 *  1/2020

OTHER PUBLICATIONS

Extended European Search Report issued Oct. 1, 2024 in Patent Application No. 24175199.9, citing document 1 and 2, therein, 9 pages.

* cited by examiner

*Primary Examiner* — Casey Bryant
(74) *Attorney, Agent, or Firm* — Oblon, McClelland, Maier & Neustadt, L.L.P.

(57) ABSTRACT

An apparatus and a method for detection of defective pixels for a photon-counting detector-based computed tomography (CT) system is disclosed. In particular, the apparatus and the method disclosed herein, detect detector pixels that have intermittent behavior using on-the-fly defective pixel screening based on various criteria during an object scan. The defective pixels are discarded using a defective pixel map before image reconstruction.

16 Claims, 9 Drawing Sheets

METHOD FOR DETECTING AND HANDLING DETECTOR PIXELS WITH INTERMITTENT BEHAVIOR FOR A SMALL PIXELATED PHOTON COUNTING COMPUTED TOMOGRAPHY (CT) SYSTEM

FIELD

This disclosure relates to detection of defective pixels in a radiation detector, and, more particularly, to an apparatus and method for detecting and correcting defective pixels in a detector of a photon-counting computed tomography (CT) system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly or impliedly admitted as prior art against the present disclosure.

Computed tomography (CT) systems and methods are widely used, particularly for medical imaging and diagnosis. CT systems generally create images of one or more sectional slices through a subject's body. A radiation source, such as an X-ray source, irradiates the body from one side. At least one detector (and generally many more than one detector) on the opposite side of the body receives radiation transmitted through the body. The attenuation of the radiation that has passed through the body is measured by processing electrical signals received from the detector.

Generally, the X-ray source is mounted on a gantry that revolves about a long axis of the body. The detectors are likewise mounted on the gantry, opposite to the X-ray source. A cross-sectional image of the body is obtained by taking projective attenuation measurements at a series of gantry rotation angles, transmitting the CT projection data to a processor via a slip ring that is arranged between a gantry and stator, and then processing the CT projection data using a CT reconstruction algorithm such as, for example, inverse Radon transform, a filtered back-projection, Feld Kamp-based cone-beam reconstruction, iterative reconstruction, or other methods.

Conventionally, energy-integrating detectors (EIDs) have been used to measure CT projection data. Nowadays, photon-counting detectors (PCDs) present a feasible alternative to energy-integrating detectors. In a photon-counting CT system that is based on the PCDs, a semiconductor-based detector using direct conversion is employed to resolve the energy of the individual incoming photons and generate measurements of multiple energy bin counts for each integration period.

When a photon deposits energy on the sensor materials (such as, for example, CdTe/CZT/Si) of a detector, a charge cloud is formed and drifts toward the anode under the applied electric field. The detector energy response degradation/distortion largely comes from charge sharing, k-escape, and scattering effects in the energy deposition and the following charge induction process, as well as electronic noise in the associated front-end electronics. Due to finite signal induction time, a high count-rate condition, pulse pile-up also distorts the detector energy response.

Due to sensor material non-uniformity and performance variations in the associated front-end electronics, the actual detector responses of the integrated detector pixels are slightly different from each other. With proper calibration of the forward model, most detectors can generate measurements that can provide a good pathlength estimate by solving the inverse problem. However, if the performance of a pixel is way beyond nominal, it is possible that its measurement can no longer be used and needs to be discarded for further processing.

Unlike conventional scintillator-based EIDs, a defective photon-counting detector pixel can exhibit the following issues: (1) noisy counting background, (2) abnormal counting performance, (3) abnormal energy resolution, (4) non-linear energy response, and (5) an inaccurate energy threshold. As a result, pixels might not be correctly calibrated, and the screening criteria for detecting a defective pixel can be more complicated than in the conventional energy integration detector (EID) system.

However, PCDs have many advantages, including their capacity for performing spectral CT and the ability to divide the scan area into smaller pixels for greater resolution. Spectral CT can be advantageous. Spectral CT provides information regarding the change in the X-ray attenuation as a function of the energies of the X-rays. In spectral imaging, measurements of multiple energy bin counts are used to resolve dissimilar materials that might exhibit the same CT number as in conventional images. For example, spectral CT is desirable because dissimilar materials, such as bone and water, exhibit different spectral absorption signatures, enabling a spectral-resolved CT scan to be decomposed into material components. For a photon-counting CT system, the PCDs can generate counting images based on measurements of the total count of each detector pixel in an integration period. Compared to a conventional CT system based on EIDs, measurements of the PCD-based CT system provide equal weighting of each detected photon, which is more optimal for resolving the dissimilar materials.

Although techniques exist to screen out defective pixels before performing an object scan for conventional scintillator-based detectors, such as interpolating values from measurements of neighboring good pixels, such techniques are not available for photon-counting detectors. Also, existing techniques face some challenges with detection of defective pixels during an object or patient scan. Accordingly, it is one object of the present disclosure to provide methods and systems for detection of defective pixels for photon-counting CT systems.

SUMMARY

In one embodiment, there is provided a photon-counting computed tomography (CT) apparatus, comprising processing circuitry configured to receive a first defective pixel map of a detector of the apparatus, wherein the first defective pixel map is generated from results of a calibration scan; perform a scan of a patient; determine a second defective pixel map based on results of the scan of the patient; and update the first defective pixel map based on the determined second defective pixel map.

In another embodiment, there is provided a method for determining a defective pixel in a detector of a photon-counting computed tomography (CT) apparatus, comprising: receiving a first defective pixel map of the detector, wherein the first defective pixel map being generated from results of a calibration scan; performing a scan of a patient; determining a second defective pixel map based on results of the scan of the patient; and updating the first defective pixel map based on the determined second defective pixel map.

In another embodiment, there is provided a photon-counting computed tomography (CT) apparatus, comprising a photon-counting detector, and processing circuitry configured to receive a first defective pixel map of a the photon-counting detector, wherein the first defective pixel map is generated from results of a calibration scan; determine an energy spectrum of received photons for each pixel of a plurality of pixels of the photon-counting detector; and determine a second defective pixel map based on a count value in a predetermined energy bin of the determined energy spectrum of the pixel; and update the first defective pixel map based on the determined second defective pixel map.

BRIEF DESCRIPTION OF THE DRAWINGS

A more complete appreciation of this disclosure and many of the attendant advantages thereof is provided by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. Furthermore, the terms "approximately," "approximate," "about," and similar terms generally refer to ranges that include the identified value within a margin of 20%, 10%, or preferably 5%, and any values therebetween.

To address the above-identified challenges of known defective-pixel detection devices and methods for computed tomography (CT) systems, the apparatus and methods disclosed herein have been developed in order to be implemented for photon-counting detectors in a computed tomography (CT) system. Further, the examples provided herein of applying these methods are non-limiting, and the methods described herein can be used in other medical imaging modalities such as MRI, PET/SPECT, etc., using the framework proposed herein. Accordingly, the discussion herein discloses and describes merely exemplary implementations of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public. Moreover, circuitry configured to perform features described herein may be implemented in multiple circuit units (e.g., chips), or the features may be combined in circuitry on a single chipset.

Figure 1:
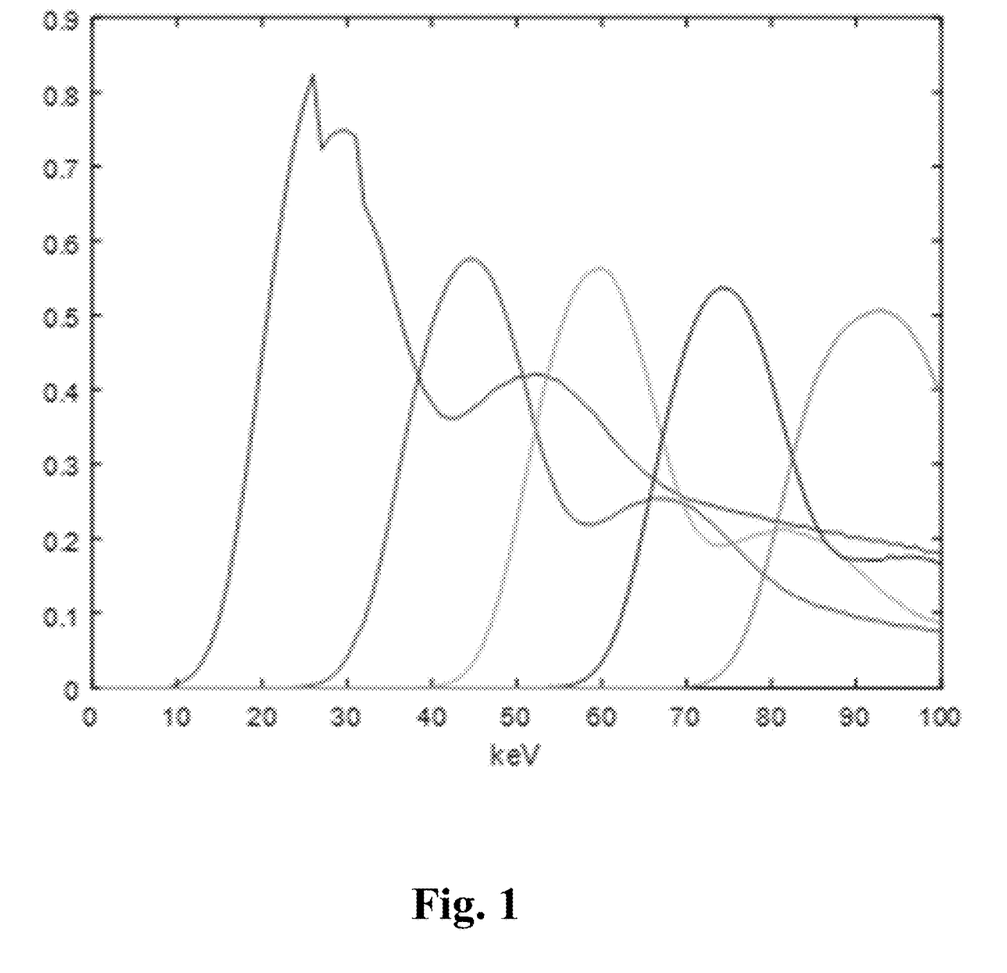
FIG. 1 shows an example of a PCD bin response function for a photon-counting detector with each curve representing an example function for each energy bin.

In a transmission measurement using a photon-counting energy-resolving detector (PCD) in the embodiments herein, the forward model is formulated as:

$$N_b(l_{1,\ldots,M}) = N_0 \times \int dE w(E) S_b(E) \exp\left(-\sum \mu_m l_m\right)$$

where $S_b(E)$ is the bin response function defined as $$S_b(E) = \int_{E_{bL}}^{E_{bH}} dE' R(E, E'), R(E, E')$$

is the detector response function, and $E_{bL}$ and $E_{bH}$ are the low and high energy thresholds of each counting bin. FIG. 1 shows an example model of a typical response function $S_b(E)$ for a photon-counting detector, where a long tail above the energy window is induced by charge sharing, k-escape, and scattering effects. In FIG. 1, the low energy tail is mostly due to the finite energy resolution from the associated electronic noise. $N_0$ is the total flux from an air scan, $\mu_m$ and $l_m$ are the $m^{th}$ basis material linear attenuation coefficient and integrated pathlength, and w(E) is the normalized incident X-ray spectrum. In practice, both w(E) and $S_b(E)$ are not exactly known and can be combined as one term $S_{wb}(E)$=w(E) $S_b(E)$, which is defined as the weighted bin response function.

The photon-counting detector is known to have complexities in terms of sensor fabrication, front-end electronics performance, and the packaging process. Defective pixels of the photon-counting detectors can exhibit issues, such as high background count, counting nonuniformity, abnormal energy response, instability, etc. As a result, the pixel either cannot produce a valid measurement with a stable forward model or has a forward model that is insensitive to the pathlength information, but either way, the pixel should be excluded in the scanning measurements or further processing.

As seen in greater detail below, a defective pixel does not have to be completely inactive to be considered a defective pixel, and a defective pixel can be considered defective for a first imaging protocol and not for a second imaging protocol. It is also quite common for detectors to experience degradation with accumulated usage, and new defective pixels can emerge from time to time. In addition, some detector pixels can exhibit intermittent behavior, and the counting or spectral response of such pixels can change during a relatively short period of time, e.g., from a few hours to a few days. Without proper identification of the defective pixels and subsequent correction in data processing, the resultant images can have a visible ring artifact that affects diagnosis.

Figure 2A:
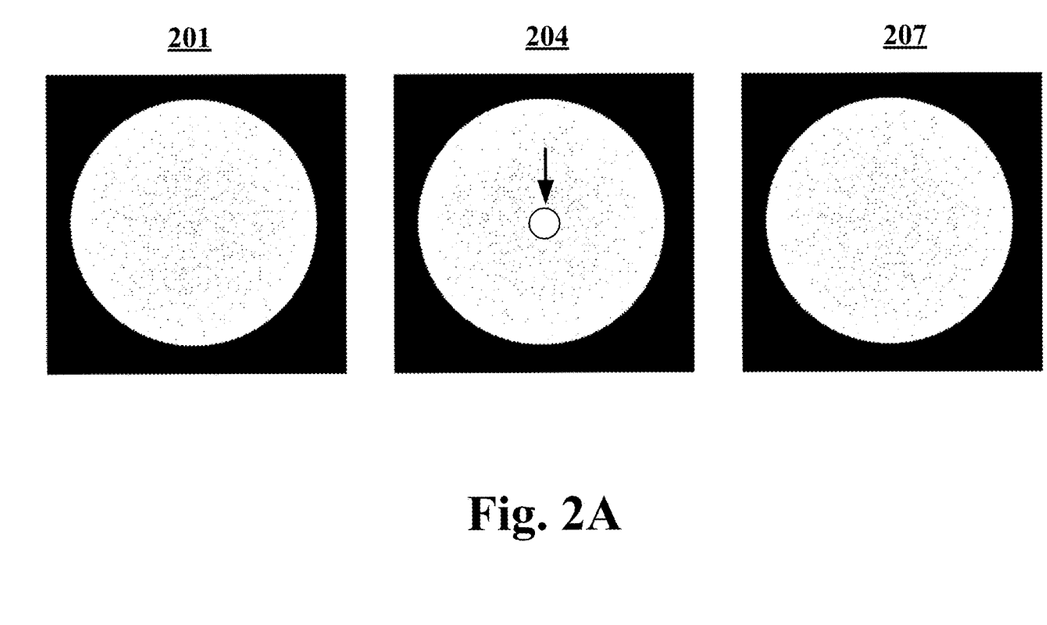
FIG. 2A shows examples of detector pixels exhibiting intermittent behavior through example water phantom images acquired at separate times.

FIG. 2A shows an example of defective pixel with intermittent behavior. In this example, it can be seen that the first phantom scan 201, captured at time A, is a ring-free scan. After two hours, at time B, a second phantom scan 204 has one detector pixel with changed counting behavior that occurred within two hours, leading to an artificial ring in the image, as shown by the arrow. However, the counting behavior of that particular detector pixel recovered a few days later and resulted in a ring-free image in the third phantom scan 207 captured at time C, as shown in FIG. 2A.

Figure 2B:
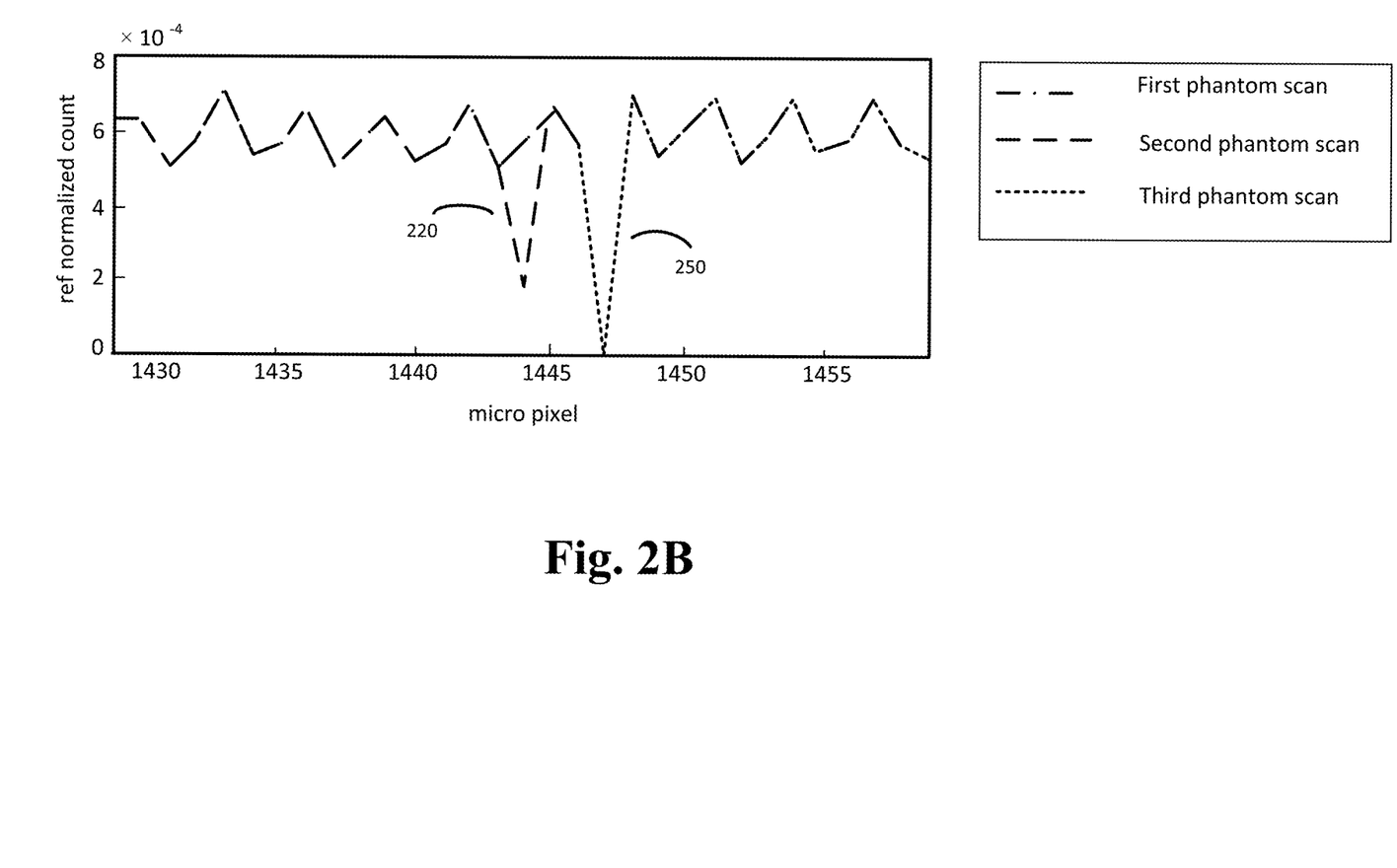
FIG. 2B shows an example profiles of normalized bin counts received by pixels of photon-counting detector along detector channel direction corresponding to example water phantom images of FIG. 2A.

FIG. 2B shows an example of normalized counts received by detector pixels of a photon-counting detector along the detector channel direction. All three phantom scans show overlapping graphs of normalized counts for most pixels, except one detector pixel of the second phantom scan that exhibits an abnormal counting response 220. This abnormal counting response 220 corresponds to the artificial ring in the second phantom scan 204 of FIG. 2A. This detector pixel behaves normally during the first phantom scan and the third phantom scan. Additionally, one neighboring detector pixel exhibits an abnormal counting response 250, as shown in FIG. 2B, corresponding to a pixel which is non-responsive in all three phantom scans.

This changing nature of the intermittent detection behavior, if not corrected, leads to degradation of image quality of images reconstructed using such scans. Accordingly, there is a need to develop an in-system method that can capture such defective pixels in the underlying scan, and provide correction for these defective pixels in subsequent data processing for an improved image quality in image reconstruction. In particular, the embodiments described in this disclosure provide an apparatus and a method to detect defective pixels with intermittent behavior in the underlying scan, and to provide correction for such defective pixels in image reconstruction.

Figure 3:
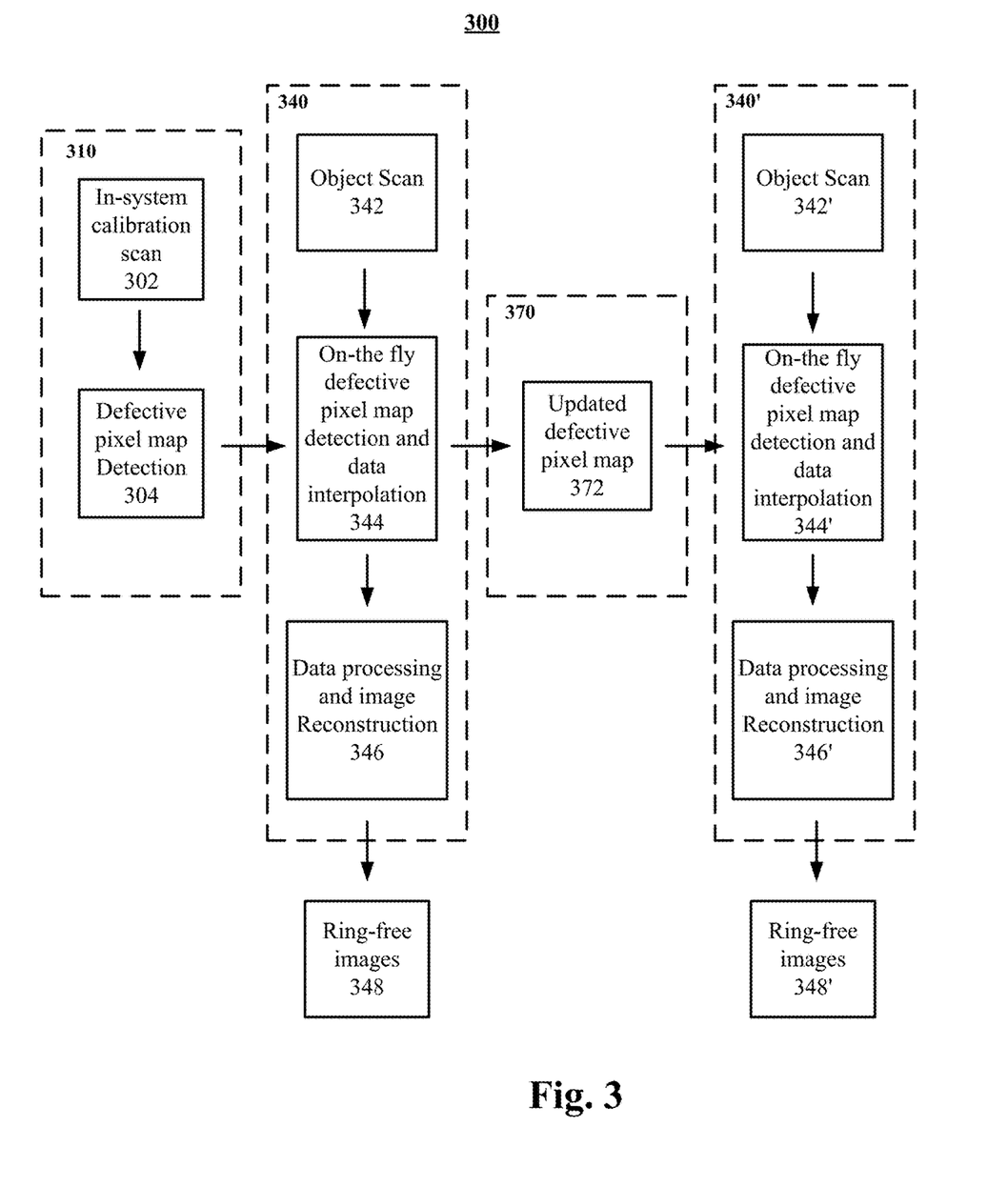
FIG. 3 shows an exemplary flow diagram of defective pixel detection, according to one implementation.

FIG. 3 shows an example workflow 300 of detection of defective pixels using an on-the-fly defective pixel screening method. This workflow 300 includes three processes: (1) process 310, which is a calibration process that generates a first defective pixel map before an object scan is taken; (2) process 340 which is an on-the-fly defective pixel screening method performed during an object scan and generates a second defective pixel map; and (3) process 370, which updates the first defective pixel map generated during process 310 with the second defective pixel map generated during process 340.

In process 310, in step 302, a calibration scan is performed. Generally, this calibration scan can be an air scan or a static scan with a rectangular slab with a uniform attenuation profile that generates a desired uniform incident X-ray spectrum and flux. Further, in step 304, a first defective pixel map is generated from the calibration scan, i.e., a map of all the defective detector pixels of the calibration scan is generated and stored in a memory.

In process 340, in step 342, an object scan is performed. Generally, the object scan can be a phantom scan, a scan of a patient, a scout scan, which is typically a 2D projection of the object being scanned, or a separate scan acquired before or after a target scan with an air or water phantom. Due to the non-uniform nature of the measurement of the detector pixels in the presence of attenuating material, the criteria or rule applied for defective pixel detection in calibration scans cannot be applied directly to the results of object scans.

In step 344, an on-the-fly defective pixel screening method is implemented to generate a second defective pixel map, which indicates all the defective detector pixels detected from the results of the object scan. The detected second defective pixel map is also stored in a memory.

In one implementation of the embodiments disclosed herein, for detecting defective pixels, an energy spectrum of photons detected at each detector pixel of the object scan is determined. Further a proportion or ratio of high energy photons in the determined energy spectrum is determined.

In another implementation of the embodiments disclosed herein, the energy spectrum of photons detected at each detector pixel in multiple views of the object scan is determined. A time average of the proportion or ratio of high energy photons in the energy spectrum for the multiple views is then determined to detect abnormal intermittent detector pixels.

In process 370 of the workflow 300, in step 372, the first defective pixel map generated in step 304 is updated using the second defective pixel map including one or more pixels with intermittent behavior identified in the object scan in step 344. In process 340, in step 344, once a particular defective pixel with intermittent behavior is identified during the object scan and included in the second defective pixel map, the particular defective pixel along with the previously identified defective pixels in the first defective pixel map are discarded and replaced by the interpolated values using surrounding good pixels. In step 346, further data processing and image reconstruction is performed using the interpolated values, resulting in ring-free images 348.

The workflow can further comprise repetition of process 340, which is shown as process 340' in the workflow 300. In every repetition of process 340, new defective pixels with intermittent behavior can be identified from object scans, and the first defective pixel map generated from the calibrations scan can be further updated. The update step 372 is also repeated for every subsequent object scan. Then the workflow 300 produces ring-artifact free reconstructed images for the photon-counting computed tomography (CT) scanner.

In one embodiment of the on-the-fly defective pixel screening method, a proportion of high energy spectrum is used to identify detector pixels with abnormal spectral responses. In a photon-counting detector-based computed tomography (CT) system, each detector pixel resolves the energy of the incoming photons. Consequently, the system generates measurements of multiple energy bin counts as multi-energy measurements for a given integration period. As a result, the multi-energy measurements form an energy spectrum of incoming photons. Various criteria are used to detect defective detector pixels with intermittent behavior based on the energy spectrum of photons detected at each detector pixel.

In one criterion for screening defective detector pixels using an energy spectrum of photons detected at each detector pixel, a proportion of high energy photons in the energy spectrum is calculated. In particular, according to this criterion, a detector pixel is considered defective if the proportion of high energy photons in the energy spectrum compared to the total spectrum count is less than a threshold value, i.e., if:

$$\frac{N_{>\epsilon}}{N_{tot}} < T_\epsilon,$$

wherein $N_{>\in}$ is the number of incoming photons with energy greater than a threshold energy ($\in$ keV), $N_{tot}$ is the number of total counts of incoming photons, and $T_\in$ is a threshold value that indicates the minimum proportion of incoming photons with energy level greater than the threshold energy ($\in$ keV) across various parameters of the photon-counting detector, such as, for example, attenuation levels under a given tube voltage.

The threshold value $T_\in$ is chosen based on a theoretical calculation, a computer simulation, or a physical scan generated using a photon-counting detector. $T_\in$ typically changes with parameters of the photon-counting detector, which include a tube voltage and filtration of the photon-counting detector.

Figure 4:
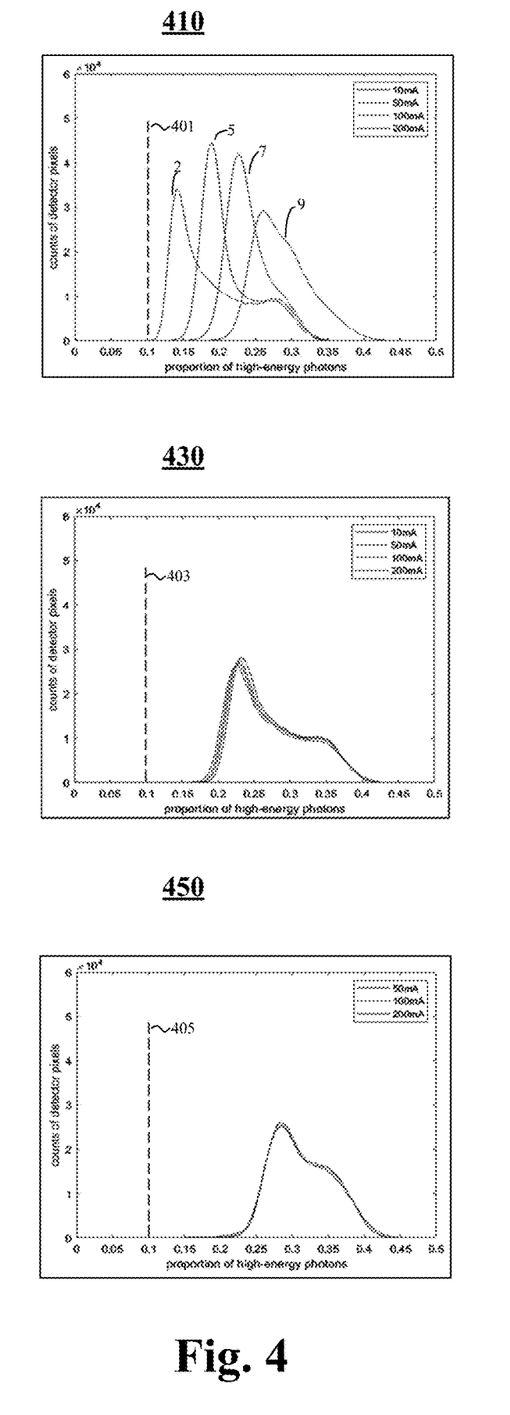
FIG. 4 shows example histograms of the proportion of photons of pixels of a photon-counting detector across multiple current and attenuation levels of the detector, according to one criterion of an implementation.

FIG. 4 shows example histograms 410, 430, and 450 of the proportion of photons with energy greater than a sample threshold energy and a sample tube voltage across multiple mA levels and attenuation levels. In these example histograms, the sample threshold energy chosen is 80 keV, and the sample tube voltage chosen is 120 kVp. Example histogram 410 shows the proportion of photons with energy greater than 80 keV under 120 kVp across 10 mA (2), 50 mA (5), 100 mA (7), and 200 mA (9) levels of tube current with a water pathlength of 0.1 cm.

Example histogram 430 shows the proportion of photons with energy greater than 80 keV under 120 kVp across 10 mA, 50 mA, 100 mA, and 200 mA levels (moving from left to right in the graph) of tube current with a water pathlength of 16 cm. Example histogram 450 shows the proportion of photons with energy greater than 80 keV under 120 kVp across 50 mA, 100 mA, and 200 mA levels of tube current with a water pathlength of 32 cm, where the proportion of photons across all levels of tube current is more or less similar.

It is to be noted that, for a vast majority, i.e., about 99% of the detector pixels, more than 10% of detected photons are above the threshold energy 80 keV, regardless of flux level and pathlength in all three example histograms 410, 430, and 450. It can be concluded from these examples that, for this particular case, the threshold value indicating minimum proportion of incoming photons with energy level greater than the chosen threshold energy of 80 keV that can be used for a screening threshold for an object scan is 0.1. This threshold value is shown as 401 in example histogram 410, as 403 in example histogram 430, and as 405 in example histogram 450.

It is to be noted that, in this particular case, any detector pixel that receives less than 10% of the photons at or above threshold energy of 80 keV in total counts, i.e., has a threshold value less than 0.1, will be rejected as a defective pixel before image reconstruction by processing circuitry implementing this method.

Figure 5A:
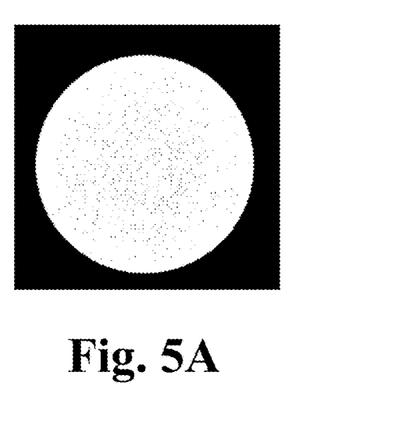
FIGS. 5A-5F illustrate example scans and detector responses before and after defective pixel detection and correction, according to one implementation.
Figure 5B:
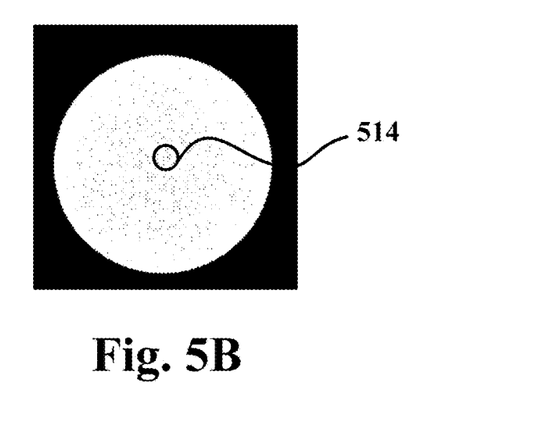

In one embodiment of the disclosure, processing circuitry in a photon-counting detector implements the on-the-fly defective pixel screening method using the criterion described above. FIGS. 5A through 5F illustrate the implementation of the described criterion of the on-the-fly defective pixel screening by processing circuitry of a photon-counting computed tomography (CT) scanner. FIG. 5A shows an image from a first normal water phantom scan at time A. FIG. 5B shows an image from a second normal water phantom scan at time B, i.e., about an hour later than time A, with an artificial ring 514. This artificial ring is a result of a defective pixel.

Figure 5C:
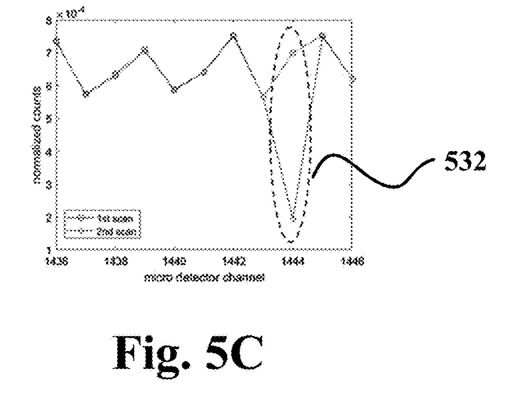

FIG. 5C shows the total counts received at each detector pixel along the detector channel direction at different acquisition time points, time A and time B. The highlighted detector pixel 532 at time B, with counts deviated as compared to the detector pixel at time A, corresponds to the artificial ring 514 in the image of the second water phantom scan.

Figure 5D:
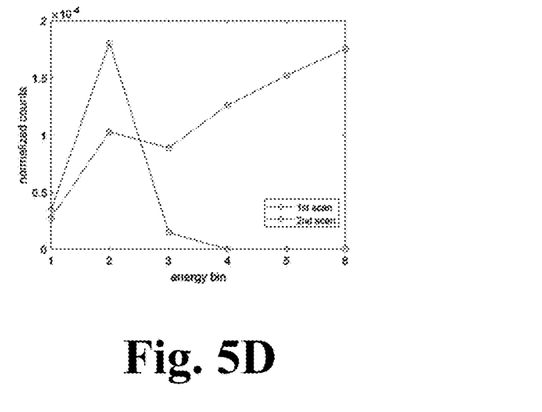
Figure 5E:
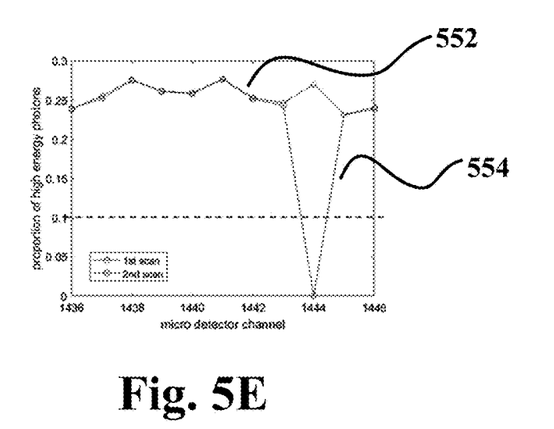

FIG. 5D shows the spectrum distortion of the received photons at the defective pixel. FIG. 5E shows the proportion of photons with energy greater than a chosen threshold energy (for example, 80 keV) in a particular bin (for this example, it can be seen that bin 6 contains counts of photons with energy greater than the threshold energy 80 keV) in the energy spectrum, where the defective pixel shows an anomaly 554 in the second phantom scan. For the response 552, the proportion of high energy photons is 0.27, which is greater than the set threshold value of 0.1. Thus, the detector pixels corresponding to response 552 are not defective. For the anomaly 554, the proportion of high energy photons is less than the set threshold value of 0.1, thus, the detector pixel corresponding to 554 is a defective pixel.

Figure 5F:
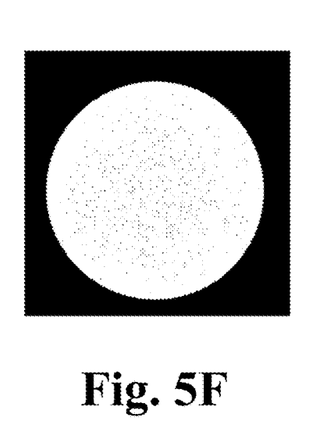

This defective pixel, once detected by the processing circuitry in the photon-counting detector implementing the criterion of on-the-fly defective pixel screening described above, is then discarded from the detector pixel data. As shown in FIG. 5F, the resulting image of the third phantom scan, i.e., after defective pixel detection and correction, is a ring-free image.

In another criterion for screening defective detector pixels using an energy spectrum of photons received at each detector pixel, the threshold value $T_\in$ can vary spatially across the photon-counting detector channels or rows. Threshold value $T_\in$ indicates the minimum proportion of incoming photons with energy level greater than the threshold energy ($\in$ keV) across various parameters of the photon-counting detector. In this criterion, the parameters of the photon-counting detector affecting the threshold value includes attenuation levels, tube voltage, filtration, and a wedge that provides additional attenuation that varies spatially.

Figure 6A:
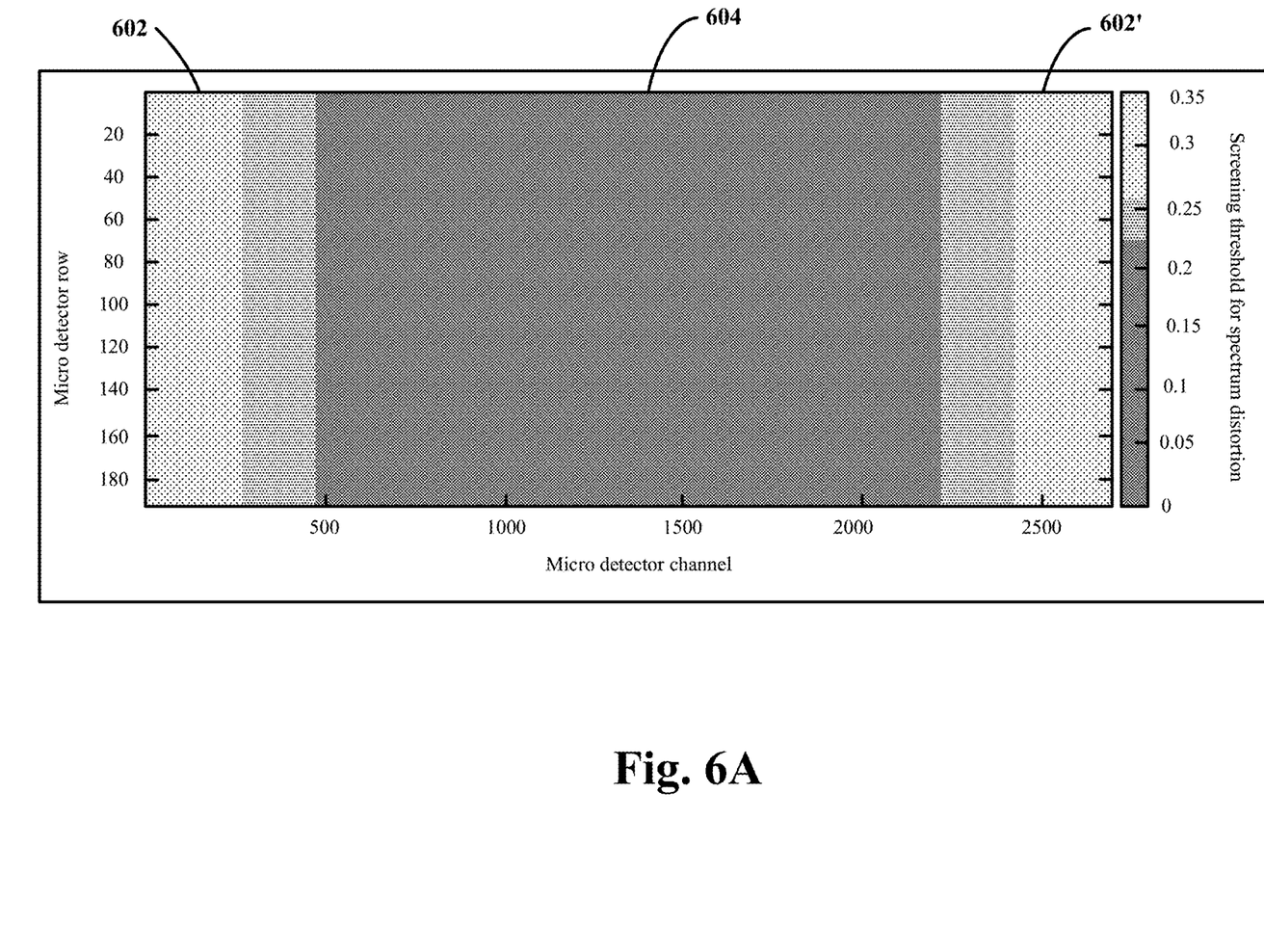
FIG. 6A shows an example of photon energy across a photon-counting detector channel and rows, according to one implementation.

FIG. 6A illustrates the proportion of photons with energy greater than a chosen threshold energy (80 keV) across the entire photon-counting detector array, under a chosen 120 kVp tube voltage at a chosen 10 mA tube current with a large wedge with respect to a 0.1 cm water pathlength. It can be seen in FIG. 6A that the proportion of high-energy photons varies spatially at the detector plane, with peripheral channels 602, 602' carrying more high-energy photons in the energy spectrum than the central channels 604 due to wedge attenuation. In this case, the screening threshold $T_\in$ can be set higher for peripheral channels so as to tighten the screening criterion.

Figure 6B:
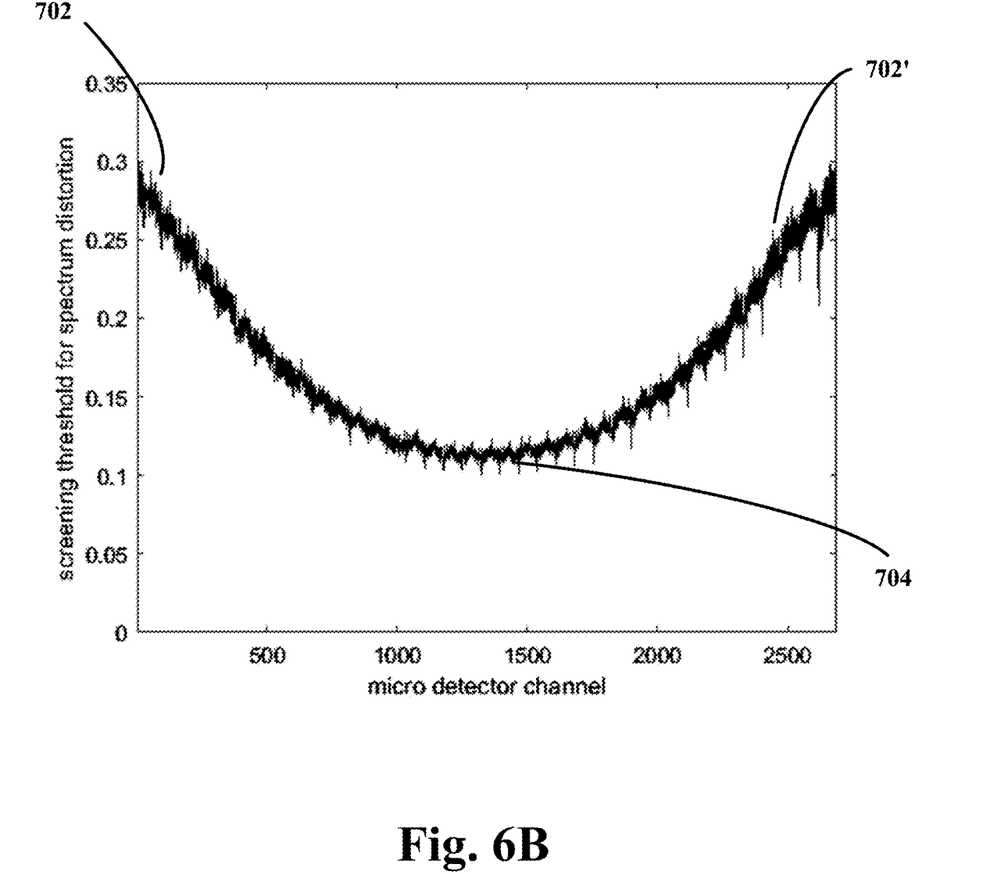
FIG. 6B shows an example of screening threshold for spectrum distortion, according to one implementation.

As seen in the FIG. 6B illustrating the resultant screening threshold $T_\in$ with respect to detector channels, the peripheral detector channels 702, 702' can have a screening threshold $T_\in$ set to a higher value than the screening threshold $T_\in$ for the central detector channels 704.

Alternatively, as the proportion of high energy photons in the energy spectrum typically increases as object attenuation increases, $T_\in$ can be set higher for areas where greater object attenuation is expected, which results in a higher $T_\in$ value in the center and a lower $T_\in$ value in the periphery. In another embodiment of the disclosure, processing circuitry implements the on-the-fly defective pixel screening method using this criterion.

In one embodiment of the disclosure, in the on-the-fly defective pixel screening method, a ratio or proportion between individual energy bins of an energy spectrum of the incoming photons of the photon-counting detector pixels is used to detect energy spectrum distortion. In one embodiment, a criterion for a defective pixel is that if the ratio of high-energy bin counts $E_{bH}$ to low-energy bin counts $E_{bL}$ is lower than a predefined threshold value, the energy spectrum of this particular pixel is considered distorted, and therefore the pixel is identified as a defective pixel.

Similar to other embodiments disclosed herein, the threshold value used for energy bin ratio criterion can be determined from a theoretical calculation, a computer simulation, or physical scans. The threshold value defined herein depends on the energy range, i.e., [$E_{bL}$, $E_{bH}$], for each of the two energy bins used to calculate the ratio, in addition to the tube voltage and filtration of the photon-counting detector. The energy bin thresholds, $E_{bL}$ and $E_{bH}$, of detector pixels can be adjusted to enhance sensitivity to spectrum distortion. In another embodiment of the on-the-fly defective pixel screening disclosed herein, processing circuitry implements the on-the-fly defective pixel screening method using the energy bin thresholds criterion.

Other embodiments disclosed herein implement the on-the-fly defective pixel screening methods based on various other criteria. These criteria can be, for example, calculating multiple ratios with different combinations of energy bins of the photon energy spectrum, comparing the count rate of a low energy bin of a photon energy spectrum to a threshold value, identifying an energy bin with a maximum count rate where the count rate is normalized by a width of the energy bin of the photon energy spectrum, a weighted average of a collection of energy bins of the photon energy spectrum, a variance of a collection of energy bins of the photon energy spectrum, and a neural network to detect an anomaly in the energy distribution of the of the photon energy spectrum.

In certain scenarios, the intermittent behavior of a detector pixel is in a shorter time scale, such as in milliseconds. Therefore, the on-the-fly defective pixel screening method has an extended implementation for such scenarios by examining if there is any temporal inconsistency during an object scan. The embodiments for the on-the-fly defective pixel screening method includes comparing the count rate (total counts) and energy spectrum (energy bin count) differences between neighboring views.

The criterion for such an embodiment is, if the difference between the count rate (total counts) and energy spectrum (energy bin count) of neighboring views exceeds the predefined thresholds given the imaging task and scan condition for any pixel, then that pixel is identified as an intermittent defective pixel. The method is further extended to another criterion based on frequency domain analysis, for example, by checking the Fourier transformed view data amplitude. If a pixel exhibits any abnormal frequency amplitude comparing to other pixels, it is another indication that pixel is problematic and should be rejected.

In the embodiments disclosed above, the on-the-fly defective pixel screening is performed at a micro-pixel level at the detector. In another implementation of this embodiment, the on-the-fly pixel screening is performed at a macro-pixel level. During a screening performed at the macro-pixel level, either summed or averaged readouts of a N×M grid of micro pixels of the detector are utilized for further processing. The micro-pixel detector measurements are then reformed to macro-pixel measurements by combining neighboring micro-pixel measurements. The on-the-fly defective pixel screening is then performed using the macro-pixel measurements of the detector pixels. In such an implementation, the resultant defective pixel and the corresponding defective pixel map are at the macro-pixel level. Further, the defective pixel at the macro-pixel level is interpolated using values of the neighboring macro-pixels.

In another embodiment of the disclosure, the on-the-fly defective pixel screening is performed on a 2-D scout scan of the object. In this implementation of the embodiment, a maximum and a minimum attenuation of each pixel received at the detector is calculated. Based on a range of attenuations calculated using a theoretical calculation, a computer simulation or a physical scan using the photon-counting detector, a threshold range is pre-determined. The maximum and minimum attenuations of each pixel received at the detector is compared to the threshold range for the on-the fly defective pixel detection.

In another embodiment of the disclosure, the on-the-fly defective pixel screening is performed on phantom scan or air scan. In one implementation of the embodiment, the phantom scan or the air scan is performed before the object scan. In another implementation of the embodiment, the phantom scan or the air scan is performed after the object scan. Generally, the attenuation profiles of each of the pixels of the detector are known in case of a phantom scan or an air scan. For the implementation using such scans, a stricter threshold can be used for the screening. Also, the screening workflow can be repeated multiple times over a certain time window to capture the defective pixels with intermittent behavior.

In choosing the thresholds for the methods based on the various criteria disclosed in the embodiments of the present disclosure, a neighboring group of pixels can be used as a reference, by using the mean energy bin count value view by view, or a group of views by a group of views. If any pixel shows outstanding count rate or spectrum deviations from the mean value during object scans, the pixel can be identified as a defective pixel.

Figure 7:
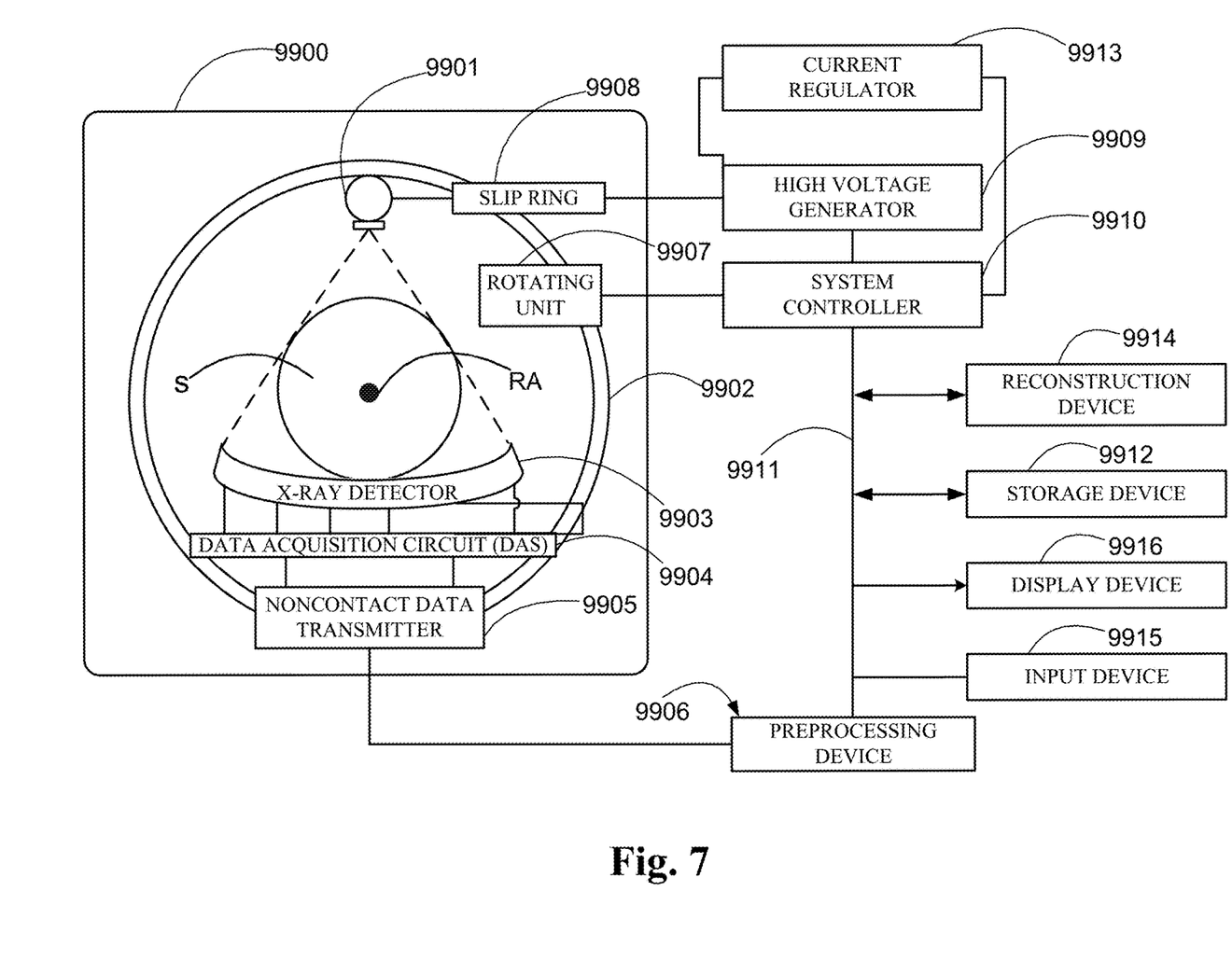
FIG. 7 shows a schematic of an implementation of a computed tomography (CT) scanner, according to one implementation.

It can be appreciated that, in one embodiment, the above described on-the-fly defective pixel screening methods based on the various criteria is applicable to a computed tomography (CT) apparatus or scanner. FIG. 7 illustrates an implementation of a radiography gantry included in a CT apparatus or scanner. As shown in FIG. 7, a radiography gantry 9900 is illustrated from a side view and further includes an X-ray tube 9901, an annular frame 9902, and a multi-row or two-dimensional-array-type X-ray detector 9903. The X-ray tube 9901 and X-ray detector 9903 are diametrically mounted across an object, such as, for example, a patient, on the annular frame 9902, which is rotatably supported around a rotation axis RA. A rotating unit 9907 rotates the annular frame 9902 at a high speed, such as, for example, 0.4 sec/rotation, while the object is being moved along the axis RA into or out of the illustrated page.

An embodiment of an X-ray computed tomography (CT) apparatus according to the present disclosure will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present disclosure can be applied to either type. In this case, the rotate/rotate type, which is currently the mainstream, will be exemplified.

The multi-slice X-ray CT apparatus further includes a high voltage generator 9909 that generates a tube voltage applied to the X-ray tube 9901 through a slip ring 9908 such that the X-ray tube 9901 generates X-rays. An X-ray detector 9903 is located at an opposite side from the X-ray tube 9901 across the object for detecting the emitted X-rays that have transmitted through the object. The X-ray detector 9903 is for example a photon-counting detector. The X-ray detector, or the photon-counting detector 9903 further includes individual detector elements or units, such as, for example, processing circuitry.

The CT apparatus further includes other devices for processing the detected signals from X-ray detector 9903. A data acquisition circuit or a Data Acquisition System (DAS) 9904 converts a signal output from the X-ray detector 9903 for each channel into a voltage signal, amplifies the signal, and further converts the signal into a digital signal. The X-ray detector 9903 and the DAS 9904 are configured to manage a predetermined total number of projections per rotation (TPPR).

The above-described data is sent to a preprocessing device 9906, which is housed in a console outside the radiography gantry 9900 through a non-contact data transmitter 9905. The preprocessing device 9906 performs certain corrections, such as sensitivity correction on the raw data or the on-the-fly defective pixel screening methods based on the various criteria as described in other embodiments disclosed herein.

In an embodiment, the pre-processing device 9906 implements the on-the-fly defective pixel screening methods based on the various criteria, as described in embodiments above. The pre-processing device 9906 includes processing circuitry configured to perform various steps of the on-the-fly defective pixel screening methods based on the various criteria, such as the example workflow 300.

A memory 9912 stores the resultant data, which is also called projection data at a stage immediately before reconstruction processing. The memory 9912 is connected to a system controller 9910 through a data/control bus 9911, together with a reconstruction device 9914, input device 9915, and display 9916. The system controller 9910 controls a current regulator 9913 that limits the current to a level sufficient for driving the CT system.

The detectors are rotated and/or fixed with respect to the object being scanned, such as the patient, among various generations of the CT scanner systems. In one implementation, the above-described CT system can be an example of a combined third-generation geometry and fourth-generation geometry system. In the third-generation system, the X-ray tube 9901 and the X-ray detector 9903 are diametrically mounted on the annular frame 9902 and are rotated around the object as the annular frame 9902 is rotated about the rotation axis RA. In the fourth-generation geometry system, the detectors are fixedly placed around the patient and an X-ray tube 9901 rotates around the patient. In an alternative embodiment, the radiography gantry 9900 has multiple detectors arranged on the annular frame 9902, which is supported by a C-arm and a stand.

The memory 9912 can store the measurement value representative of the irradiance of the X-rays at the X-ray detector unit 9903. Further, the memory 9912 can store a dedicated program for executing various steps of the on-the-fly defective pixel screening methods, such as example workflow 300, which includes the detection of the defective pixel, updating the first defective pixel map and accordingly discarding the defective pixels before image reconstruction. The pre-reconstruction processing of the projection data performed by the preprocessing device 9906 can include correcting for detector calibrations, detector nonlinearities, and polar effects, for example.

Post-reconstruction processing performed by the reconstruction device 9914 can include filtering and smoothing the image, volume rendering processing, and image difference processing as needed. The image reconstruction process can implement various CT image reconstruction methods. The reconstruction device 9914 can use the memory to store, e.g., projection data, reconstructed images, calibration data and parameters, and computer programs.

The method and system described herein can be implemented in a number of implementations but generally relate to processing circuitry for performing the on-the-fly defective pixel screening methods based on various criteria described herein. In an embodiment, the processing circuitry is implemented as one of or as a combination of an Application Specific Integrated Circuit (ASIC), a Field Programmable Gate Array (FPGA) or Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory.

Further, the memory 9912 and the memory of the processing circuitry can be non-volatile, such as ROM, EPROM, EEPROM or FLASH memory. The memory 9912 and the memory of the processing circuitry can also be volatile, such as static or dynamic RAM, and a processor, such as a microcontroller or microprocessor, can be provided to manage the electronic memory as well as the interaction between the FPGA or CPLD and the memory. The processing circuitry may implement a single processor or multiprocessors, each supporting a single thread or multiple threads and each having a single core or multiple cores.

In one implementation, the reconstructed images can be displayed on a display 9916. The display 9916 can be an LCD display, CRT display, plasma display, OLED, LED, or any other display known in the art. The memory 9912 can be a hard disk drive, CD-ROM drive, DVD drive, FLASH drive, RAM, ROM, or any other electronic storage known in the art.

While certain implementations have been described, these implementations have been presented by way of example only and are not intended to limit the teachings of this disclosure. Indeed, the novel methods, apparatuses and systems described herein may be embodied in a variety of other forms; furthermore, various omissions, substitutions, and changes in the form of the methods, apparatuses and systems described herein may be made without departing from the spirit of this disclosure.

The invention claimed is:

1. A photon-counting computed tomography (CT) apparatus, comprising:
 processing circuitry configured to
  receive a first defective pixel map of a detector of the apparatus, wherein the first defective pixel map is generated from results of a calibration scan;
  perform a scan of a patient;
  determine a second defective pixel map based on results of the scan of the patient;
 update the first defective pixel map based on the determined second defective pixel map,
 reconstruct an image from results of the scan of the patient by utilizing the updated first defective pixel map, and cause a display to display the image,
 wherein in determining the second defective pixel map, the processing circuitry is further configured to, for each pixel of a plurality of pixels of the detector:
  determine an energy spectrum of received photons received at the pixel, and determine whether the pixel is defective based on the determined energy spectrum of the pixel.

2. The apparatus of claim 1, wherein the processing circuitry is further configured to determine whether the pixel is defective based on a count value in a particular bin of the determined energy spectrum.

3. The apparatus of claim 1, wherein the processing circuitry is further configured to determine whether the pixel is defective based on a ratio of (1) those received photons with an energy value greater than a pre-determined energy value to (2) a total count of the received photons at the pixel.

4. The apparatus of claim 3, wherein the processing circuitry is further configured to compare the ratio to a threshold to determine whether the pixel is defective.

5. The apparatus of claim 4, wherein the threshold varies based on a location of the pixel on the detector for a particular set of parameters of the detector, wherein the threshold further varies based on the particular set of parameters of the detector.

6. The apparatus of claim 4, wherein the processing circuitry is further configured to determine the threshold from at least one of a theoretical calculation, a computer simulation, or a physical scan.

7. The apparatus of claim 1, wherein the processing circuitry is further configured to determine whether the pixel is defective based on a ratio of a first count value of a first particular bin to a second count value of a second particular bin of the determined energy spectrum of the pixel.

8. The apparatus of claim 1, wherein the processing circuitry is further configured to determine whether the pixel is defective based on a weighted average of count values in one or more particular bins of the determined energy spectrum of the pixel.

9. The apparatus of claim 1, wherein the processing circuitry is further configured to determine whether the pixel is defective based on a variance of count values in one or more particular bins of the determined energy spectrum of the pixel.

10. The apparatus of claim 1, wherein the processing circuitry is further configured to determine whether the pixel is defective based on outputs of a neural network trained to detect an irregularity in an energy distribution of the determined energy spectrum of the pixel.

11. A method for determining a defective pixel of a detector of a photon-counting computed tomography (CT) apparatus, the method comprising:
receiving a first defective pixel map of the detector, wherein the first defective pixel map was generated from results of a calibration scan;
performing a scan of a patient;
determining a second defective pixel map based on results of the scan of the patient;
updating the first defective pixel map based on the determined second defective pixel map,
reconstructing an image from results of the scan of the patient by utilizing the updated first defective pixel map, and
causing a display to display the image,
wherein the determining step further comprises, for each pixel of a plurality of pixels of the detector: determining an energy spectrum of received photons received at the pixel, and determining whether the pixel is defective based on the determined energy spectrum of the pixel.

12. The method of claim 11, wherein the step of determining whether the pixel is defective further comprises determining whether the pixel is defective based on a count value in a particular bin of the determined energy spectrum.

13. The method of claim 11, wherein the step of determining whether the pixel is defective further comprises determining whether the pixel is defective is based on a ratio of (1) those received photons with an energy value greater than a pre-determined energy value to (2) a total count of the received photons at the pixel.

14. The method of claim 13, wherein in determining whether the pixel is defective further comprises comparing the ratio to a threshold.

15. The method of claim 14, wherein the threshold varies based on a location of the pixel on the detector for a predetermined set of parameters of the detector, wherein the threshold further varies based on the particular set of parameters of the detector.

16. A photon-counting computed tomography (CT) apparatus, comprising:
a photon-counting detector; and
processing circuitry configured to
receive a first defective pixel map of the photon-counting detector, wherein the first defective pixel map is generated from results of a calibration scan;
determine an energy spectrum of received photons for each pixel of a plurality of pixels of the photon-counting detector;
determine a second defective pixel map based on a count value in a pre-determined energy bin of the determined energy spectrum of the pixel;
update the first defective pixel map based on the determined second defective pixel map;
reconstruct an image from results of the scan of the patient by utilizing the updated first defective pixel map; and
cause a display to display the image,
wherein in determining the second defective pixel map, the processing circuitry is further configured to, for each pixel of a plurality of pixels of the detector: determine an energy spectrum of received photons received at the pixel, and determine whether the pixel is defective based on the determined energy spectrum of the pixel.

* * * * *